US009031733B1

(12) United States Patent
Licis et al.

(10) Patent No.: US 9,031,733 B1
(45) Date of Patent: May 12, 2015

(54) CASUALTY MONITORING SYSTEM FOR AUTONOMOUS VEHICLE

(71) Applicants: Peter Licis, Tiverton, RI (US); Michael B. Lockwood, Exeter, RI (US); Richard P. Berube, Portsmouth, RI (US); James A. DelSavio, East Providence, RI (US); Alan J. Basilica, Bradford, RI (US)

(72) Inventors: Peter Licis, Tiverton, RI (US); Michael B. Lockwood, Exeter, RI (US); Richard P. Berube, Portsmouth, RI (US); James A. DelSavio, East Providence, RI (US); Alan J. Basilica, Bradford, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 106 days.

(21) Appl. No.: 13/768,001

(22) Filed: Feb. 15, 2013

(51) Int. Cl.

| | |
|---|---|
| ***B63G 8/14*** | (2006.01) |
| ***B63H 25/42*** | (2006.01) |
| ***F41J 9/00*** | (2006.01) |
| ***F41J 9/04*** | (2006.01) |
| ***G06F 19/00*** | (2011.01) |

(52) U.S. Cl.
CPC .................................... *G06F 19/00* (2013.01)

(58) Field of Classification Search
CPC .......... B61B 13/10; B63G 8/001; B63G 1/14; B63G 1/16; B63H 25/42; G05D 1/00; F41J 9/00; F41J 9/04; Y02T 30/30
USPC ...................... 114/333, 330, 20.1; 104/138.1
See application file for complete search history.

(56) References Cited

U.S. PATENT DOCUMENTS

| | | | | |
|---|---|---|---|---|
| 3,766,518 | A * | 10/1973 | Rilett | 367/112 |
| 5,600,087 | A * | 2/1997 | Chace, Jr. | 114/20.1 |
| 5,950,543 | A * | 9/1999 | Oster | 104/138.1 |
| 7,939,192 | B2 * | 5/2011 | Hermann | 429/61 |
| 2011/0297070 | A1 * | 12/2011 | Riggs et al. | 114/330 |
| 2012/0318188 | A1 * | 12/2012 | Hudson et al. | 114/333 |

FOREIGN PATENT DOCUMENTS

| | | | |
|---|---|---|---|
| JP | 11082262 | * | 3/1999 |

* cited by examiner

*Primary Examiner* — John Q Nguyen
*Assistant Examiner* — Aaron Smith
(74) *Attorney, Agent, or Firm* — James M. Kasischke; Michael P. Stanley

(57) ABSTRACT

A casualty monitoring system is provided in communication with a vehicle controller and configured to monitor and shut down an undersea vehicle. The casualty monitoring processor and the vehicle controller receives, but is not limited to receiving; sensing notification by a depth cutoff switch, a battery over-temperature switch, an over-pressure switch which responds to internal pressure of the vehicle; and a watchdog timer which responds to a failing casualty monitor processor. Before the casualty monitoring processor or the vehicle controller responds to a predetermined setting from these components; casualty logic of the monitoring system will have immediately removed power to the vehicle via a start-up circuit.

9 Claims, 4 Drawing Sheets

CASUALTY MONITORING SYSTEM FOR AUTONOMOUS VEHICLE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

1) Field of Invention

The present invention relates to monitoring systems and more specifically, to operation and casualty monitoring systems for use on autonomous undersea vehicles.

2) Description of the Prior Art

Known performance monitoring systems used in undersea vehicles include a generally autonomous control unit in operational communication with performance monitoring subsystems. The prior art on monitoring systems include:

Yavnai (U.S. Pat. No. 6,122,572) recites a programmable decision unit capable of managing and controlling the execution of a mission by utilizing a plurality of subsystems and database capable of holding and managing data including pre-stored data and data acquired by and received from the subsystems. The programmable decision unit includes a mission plan (MP) for accomplishing the execution of the missions. The mission plan also includes a succession of iterations that has each assignment of a mission segment associated with a mission stated to one or more of the subsystems. Each iteration further includes receipt from the subsystems report data for determining either normal behavior or an exceptional event. The programmable decision unit is capable of managing and controlling the execution of the mission in an autonomous fashion whereby the vehicle becomes an autonomous vehicle.

Knoska et al. (U.S. Pat. No. 6,816,088) recites a marine vessel monitoring system capable of monitoring vessels when the vessels are unable or unavailable to be personally monitored. The system provides for inspecting and repairing a designated marine vessel at periodic intervals and for reporting the results of such inspections and repairs to the vessel's owner.

Potter et al. (U.S. Pat. No. 7,194,975) provides a health monitoring system for an unmanned underwater vehicle in which the system is disposed within a submerged docking station. The health monitoring system receives signal representative of the performance of the docking station equipment and uses the data to determine the health status of the docking station equipment, to generate health status data representative thereof, and transmits the health status data to a remote station. The health monitoring system also retrieves health status data from UUVs that are periodically docked in the docking station, and transmits this data to the remote station.

Osburn, I I I et al. (U.S. Pat. No. 7,747,710) provides a system for detecting changes in measurable conditions comprising: an enterprise server, at least one vessel, and a broadcast device on the vessel. The broadcast device is in communication with a satellite. At least one remote terminal unit is on the vessel, and the remote terminal unit is in communication with an electronic cryptographic module. The remote terminal unit stores digital data in a memory area for transmission. Communications software, adapted to handle multiple telemetries and protocols, links the enterprise server directly with each vessel, collects digital data on changes in measurable conditions, and initiates an alarm when the digital data signifies a change outside a preset limit. Configuration software configures the remote terminal unit by executing configuration commands using the communication software. A broadcast device is disposed on each vessel, for enabling the remote terminal unit on each vessel to directly communicate with the enterprise server.

Lash et. al. (United States Patent Publication No. 2002/0158776) provides a remote marine monitoring and control system that compiles security information and statistics for on-board equipment on unattended boats, uses a wireless transmitter to send this data to a user over a communications network and allows a user to remotely operate the user's boat in response. Boat operational data can be provided to a user on a variety of personal communication devices and/or thru a monitoring website. These devices can also be used by the user to send a user command to remotely control the operation of the boat. The remote marine monitoring system identifies normal operating conditions for on-board equipment and compares these conditions to the operating activity in order to detect unusual activity. Security information can also be compiled and reported relating to intrusion sensors, keyless entry and the boat's physical location.

SUMMARY OF THE INVENTION

According to an embodiment of the invention; a casualty monitoring system is provided in which the monitoring system is in operational communication with a vehicle controller and other equipment to monitor and control an undersea vehicle. The casualty monitoring system is operationally connected but not limited to; depth sensors, a depth cut-off switch, leak sensors, a battery over-temperature switch, an over-pressure switch responsive to the internal pressure of a vehicle, and a watchdog timer that monitors a processor of the system. Because of the flexible capabilities of the casualty monitoring system; the system can be connected to other monitors, sensors and operating hardware.

DETAILED DESCRIPTION OF THE INVENTION

The following description is not to be taken in a limiting sense, but is made for the purpose of illustrating the general principles of the invention, since the scope of the invention is best defined by the appended claims.

The present invention relates to a system and method of use for casualty monitoring and control of autonomous undersea vehicles. The casualty monitoring system (CASMON) includes a capability for rapidly deactivating a vehicle if a predetermined fault occurs. Rapid deactivation puts the vehicle in a state for recovery and helps to prevent total loss of the vehicle.

Specifically, the invention provides a framework for a hardware and a firmware embodiment that supports the integration of multiple monitoring inputs. The firmware includes program code that may be stored on a computer usable medium. The casualty monitoring system is capable of detecting critical faults and protecting hardware from electrical and physical damage. The casualty monitoring system also records fault conditions including the time and date of each fault. This recordation enhances troubleshooting of the fault and helps to prevent similar faults.

Figure 1:
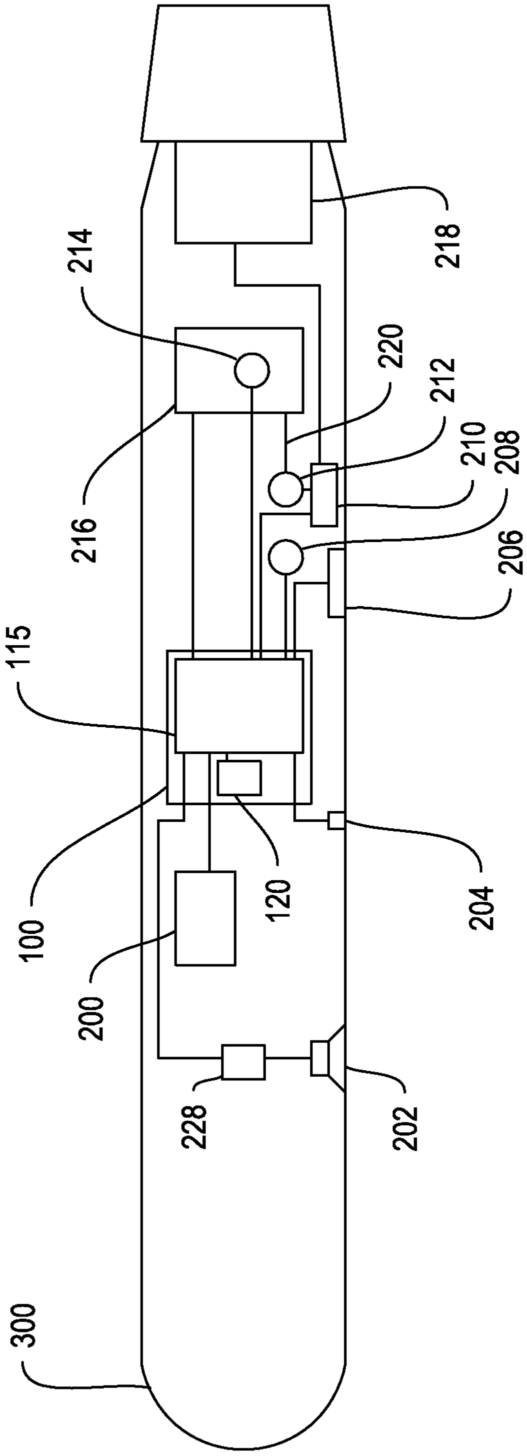
FIG. 1 depicts a schematic of a casualty monitoring system of the present invention in communication with a propulsion and control system and other equipment of an undersea vehicle.

FIG. 1 depicts the casualty monitoring system 100 in communication with a vehicle controller 200. The monitoring system 100 can receive commands from the vehicle controller 200 to shut down a vehicle 300 and to set/reset any digital outputs associated with the monitoring system. The monitoring system 100 reports the state of monitored items to the vehicle controller 200.

The casualty monitoring system 100 includes a processor 115 and a watchdog timer 120 to monitor the processor. The monitoring system 100 is also operationally connected to an acoustic receiver 202 and a depth sensor 204.

The casualty monitoring system 100 further monitors the vehicle 300 for failures such as: leakage of fluid (for example: conductive seawater) into the vehicle; current, voltage and temperature from a vehicle battery 216; as well as failures in the processor 115. As will be discussed further, the importance of the vehicle controller 200 requires additional monitoring for the controller. The casualty monitoring system 100 also communicates with a buoyancy device 206, an overpressure switch 208 for monitoring pressure within the vehicle 300, a power distribution assembly 210, and a switch 212.

The switch 212 is a power relay capable of switching hundreds of amperes of current. The switch 212 resides within a start-up circuit 220 and is electrically positioned between the battery 216 and the power distribution assembly 210 (which converts battery voltage into the voltages required by the vehicle 300). When the switch 212 closes (responding to circuits not related to the casualty monitoring system 100); the battery 216 connects to the power distribution assembly 210 through the switch 212 and the power distribution assembly creates the needed voltages; thereby, allowing the vehicle 300 to turn on. The battery 216 powers components of the vehicle 300 as well as powering a motor 218 for propelling the vehicle. An over-temperature switch 214 monitors the battery 216.

At the end of a successful run, when a vehicle shutdown is commanded by the vehicle controller 200, the casualty monitoring processor 115 asserts a "shutdown bit" (a digital output bit), which through casualty logic 116, signals the start-up circuit 220 to open the switch 212. In the event of a casualty condition, the casualty logic 116 will signal the start-up circuit 220 to open the switch 212 without requiring the bit from the casualty monitoring processor 115. When the switch 212 opens, the undersea vehicle 300 and the equipment in the vehicle power off.

The buoyancy device 206 allows the vehicle 300 to operate if positive buoyancy does not exist. When a vehicle shutdown is initiated; the casualty monitoring system 100 would activate the buoyancy device 206 for positive buoyancy; thereby, allowing the vehicle 300 to float to the ocean surface.

Figure 2:
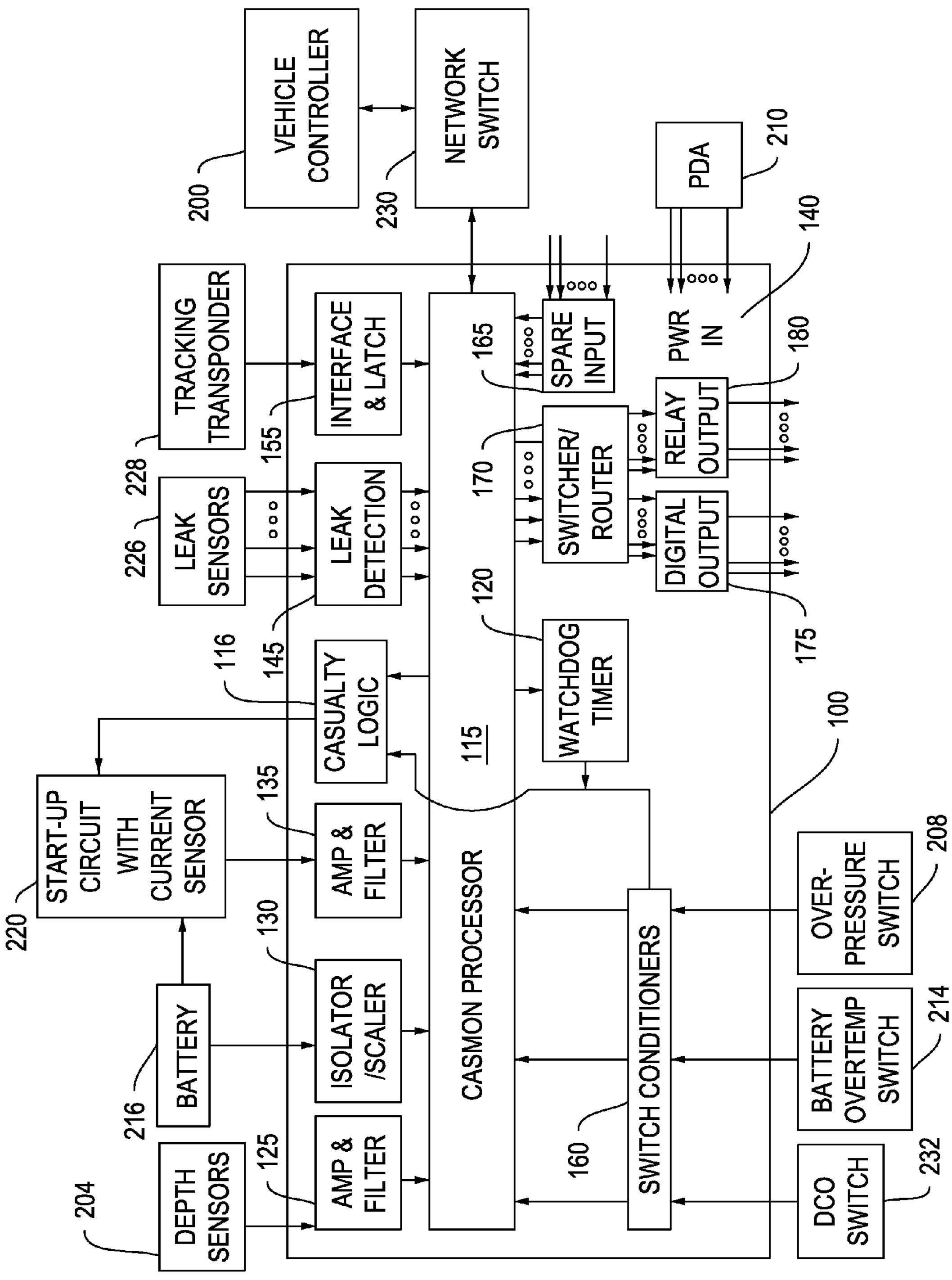
FIG. 2 depicts a block diagram of a casualty monitoring system of the present invention.

FIG. 2 depicts a block diagram of a casualty monitoring system 100 used in conjunction with the equipment of FIG. 1. As previously noted, the casualty monitoring system 100 is operationally connected with the depth sensor 204. The depth sensor 204 is a pressure sensor that provides depth information of the vehicle 300. Two or more sensors may be used either for redundancy or to have different measurement scales. For example, one measurement scale for shallower water may have greater resolution than a measurement scale for deeper water.

The casualty monitoring system 100 includes an amplifier and low pass filter 125 that conditions an analog signal from the depth sensor 204. Conditioning, in this instance, refers to a buffer amplifier and to the use of the low pass filter 125 that removes high frequency noise and spikes (if present) from a changing output voltage of the depth sensor 204. The output of the depth sensor 204 is a voltage reflecting that the deeper that the vehicle 300 is positioned or travels; the output voltage of the sensor is higher. The processor 115 converts this voltage to a digital number corresponding to the value of the voltage and scaled to units of meters. The real-time depth number is sent to the vehicle controller 200 every tenth of a second for use in an autopilot function.

The casualty monitoring system 100 also includes an isolator and scaler 130 that inputs battery voltage from the battery 216; isolates the battery from a power bus (not shown); and scales the battery voltage to levels acceptable to the casualty monitoring processor 115.

Specifically, the battery 216 is 162 Volts fully charged. This voltage, if connected to analog to digital converters of the casualty monitoring processor 115, would cause very extensive damage to the processor. The isolator and scaler 130 brings the battery voltage down to a level within the operating range of the analog to digital converters of the casualty monitoring processor 115.

For numerous reasons, it is problematic to connect a battery bus (the + and the – of the battery 216) directly to circuits. Basically, the battery voltage is too high as well as for safety and electrical noise reasons. The power distribution assembly 210 utilizes power converters (conversion of the high voltage of the battery 216 into useful lower voltages required by vehicle subsystems) that maintain isolation between the input (the battery) and the output voltages (subsystem power voltages). The current of the battery 216 is monitored using a commercially-available Hall effect sensor which has built-in isolation capabilities. The Hall effect sensor is part of the start-up circuit 220.

The casualty monitoring system 100 further includes an amplifier and filter 135 that receives an analog voltage from the start-up circuit 220; amplifies the voltage; and filters the voltage. The amplification matches the level of signal voltage to that of the inputs to the analog-to-digital inputs of the processor 115. The filtering removes noise and spikes (if present) from the output signal.

The casualty monitoring system 100 further communicates with the battery over-temperature switch 214 which starts shutdown of the vehicle 300 if the battery 216 overheats. Specifically, the over-temperature switch 214 communicates with the casualty logic 116 of the casualty monitoring system 100 which will then shut down the vehicle 300 via the start-up circuit 220. This shutdown immediacy is needed because an over-temperature of the battery 216 could result in a fire or explosion.

The casualty logic 116 is also capable of monitoring other critical signals from the vehicle 300 and determining if a critical hardware error has occurred. If the casualty logic 116 determines that a critical hardware error has occurred; the circuit outputs a signal to the start-up circuit 220 which removes power to the vehicle 300.

The casualty monitoring system 100 includes an input power port 140 that powers the system. The monitoring system 100 may require power in the following voltages: 5V, 12V, −12V, and 24V. The vehicle 300 includes the power distribution assembly 210 that provides the power to the input port 140. Upon powering up the casualty monitoring system 100; the firmware of the monitoring system initializes.

The operational firmware of the casualty monitoring system 100 utilizes leak detection circuitry 145 that monitors leak sensors 226 by detecting a short circuit between the sensors. The leak sensors 226 may be two or more contacts residing at a bottom center of the hull of the vehicle 300. The leak sensors 226 detect conductive fluid leaks in the vehicle 300.

The casualty monitoring system 100 further communicates with a tracking transponder 228. The acoustic receiver 202 is part of the tracking transponder 228 wherein the transponder is half of the acoustic tracking system of the vehicle 300. In operation, a shipboard half (not shown) of the acoustic tracking system pings into the ocean and the tracking transponder 228 aboard the vehicle 300 pings back. The shipboard half of the system then calculates a position (range and bearing) of the vehicle 300 relative to the ship. The pings are emitted periodically (typically at a rate of one ping every 8 seconds) from the ship with the tracking transponder 228 responding. This operation occurs automatically and independently of any other subsystem on the vehicle 300—including the casualty monitoring system 100. With the casualty monitoring system 100 monitoring the ping rates of the tracking transponder 228; a method by which the vehicle 300 can be remotely inactivated (shutdown) is attained.

In regard to shutting down the vehicle 300; a shipboard operator can increase the rate of pinging (for example: every two seconds instead of every eight seconds). The casualty monitoring system 100 determines the interval between pings by using the signal from the tracking transponder 228. If the casualty monitoring system 100 determines that the rate of pinging is every two seconds +/−0.1 seconds; then the casualty monitoring system assumes that the shipboard operator is requesting a shutdown of the vehicle 300. The processor 115 then sets the shutdown bit into the casualty logic 116 and subsequently into the startup circuit 220; thereby, interrupting power from the battery 216 to the vehicle 300.

The casualty monitoring system 100 also includes an interface and latch 155 that takes the ping pulse signal and converts the signal to a toggling logic level that can be monitored asynchronously. The casualty monitoring system 100 uses this toggling logic signal to determine how often the tracking transponder 228 is being interrogated.

The casualty monitoring system 100 communicates to other systems with an Ethernet (network) switch 230. Via the Ethernet switch 230, the firmware of the casualty monitoring system 100 reports monitored inputs to the vehicle controller 200. Restated, these monitored inputs include but are not limited to vehicle depth, state of a depth cutoff switch 232, current and voltage of the battery 216, battery over-temperature, the leak sensors 226, tracking transponder interrogation pulses, internal over-pressure of the vehicle, a vehicle controller keep-alive timer, and spare inputs.

The casualty logic 116 comprises logic integrated circuits that receive outputs from the depth cutoff switch 232, the battery over-temperature switch 214, the vehicle internal over-pressure switch 208, the casualty monitoring processor watchdog timer 120, and a digital output (shutdown bit) from the casualty monitoring processor 115. Signals from the above components will result in a shutdown signal being immediately sent to the startup circuit 220, without intervention of the casualty monitoring processor 115. The startup circuit 220 responds by disconnecting the battery 216 from the vehicle 300.

Other potential fault conditions which may not require an immediate shutdown of the vehicle 300 are reported to the vehicle controller 200; thereby, allowing the vehicle controller to determine the appropriate action for the specific mission. Such fault conditions include, but are not limited to detection of a seawater leak, an unexpectedly high battery current, or a battery voltage approaching a depleted state. The vehicle controller 200 (may as part of a response to the information) issue a vehicle shutdown command to the casualty monitoring processor 115 via the Ethernet.

The firmware of the casualty monitor processor 115 monitors communications via the Ethernet from the vehicle controller 200. This communication from the vehicle controller 200 may include a command to shut down the vehicle 300. In this case, the firmware of the casualty monitoring processor 115 sets a digital output (shutdown bit) which feeds into the casualty logic 116 and relays this signal to the startup circuit 220 which then disconnects the battery 216 from the vehicle 300. In addition to a shutdown command, Ethernet communications from the vehicle controller 200 may include commands to set or reset digital output bits 175 or relay outputs 180.

The depth cutoff (DCO) switch 232 opens when a maximum depth is exceeded. The switch 232 may be a pressure switch adjustable to external water pressure on the vehicle 300 as a force to open or close the switch. The switch 232 is mounted in a manifold open to seawater (not shown) with the other side of the switch inside the vehicle 300 and mounted to the manifold using a waterproof seal.

The over-pressure switch 208 notifies the casualty logic 116 to remove power to the vehicle 300 in response to high internal pressure in the vehicle. Switch conditioners 160 filter noise from the switches 208, 214 and 232 in order to prevent triggering a shutdown due to electrical noise or spikes.

In an exemplary embodiment, the casualty monitoring system 100 includes spare digital outputs and relay outputs that interface with external hardware. The casualty monitoring system 100 includes at least eight spare inputs 165 with conditioning that allows for signal voltage dividers, pull-up and pull-down functions, and filtering. The casualty monitoring system 100 further includes a signal switcher/router 170 that routes the digital outputs 175 of the processor 115 to a driver-integrated circuit or a solid state relay.

Functionality for a vehicle controller keep-alive timer (a software function of the processor 115) includes setting a shutdown bit in response to predetermined vehicle controller communication not occurring for a predetermined time. For example, if routine and periodic communications of the vehicle controller 200 have not occurred for a preset period of time; the shutdown bit may be set. If a timeout period of the vehicle controller keep-alive timer expires; the vehicle controller 200 may have suffered an operational failure and may be unable to communicate. In response, the casualty monitoring processor 115 sets a shutdown bit which transmits thru the casualty logic 116 with the result of shutting down the vehicle 300.

Figure 3:
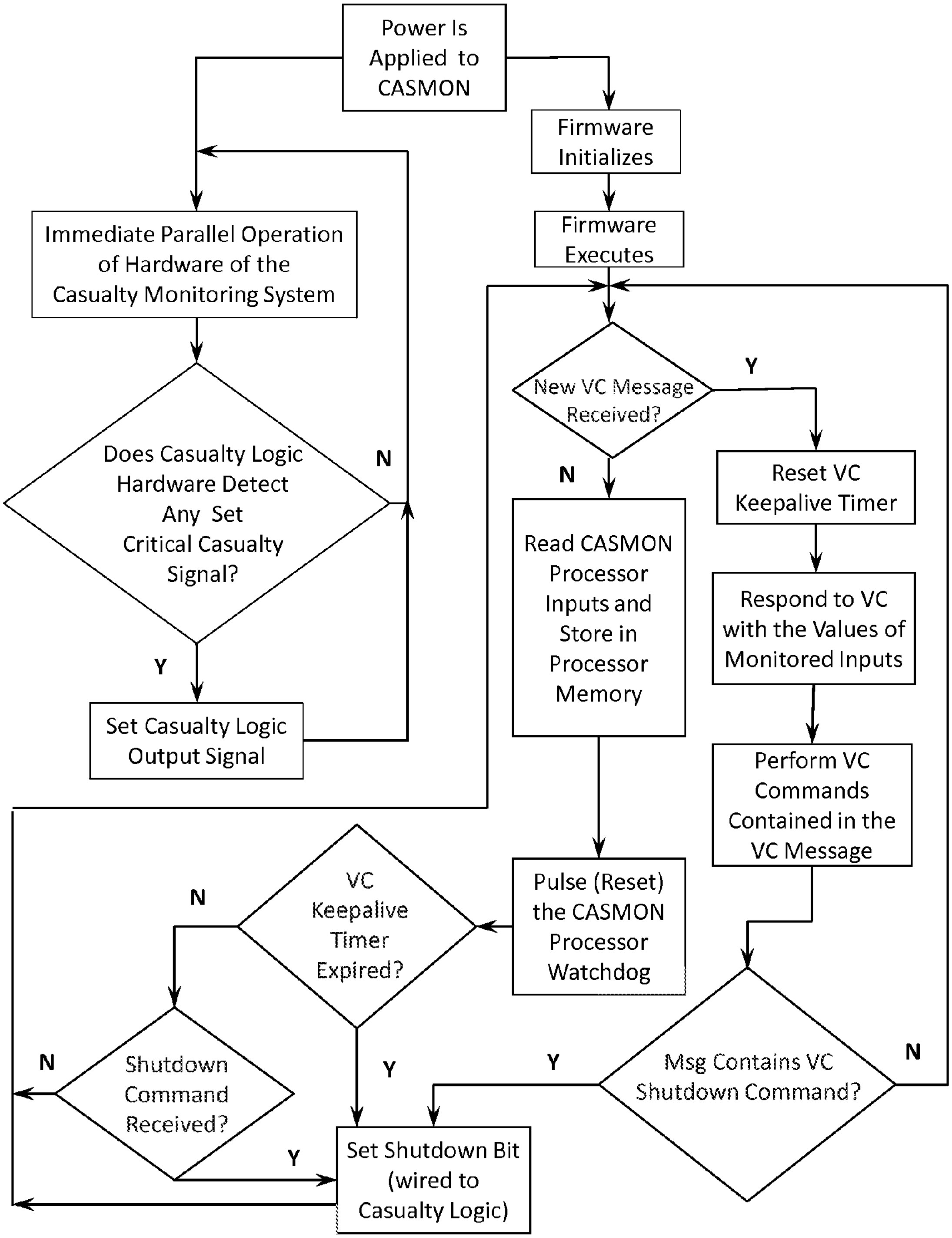
FIG. 3 depicts an operational flow chart for the casualty monitoring system of the present invention.

FIG. 3 depicts a flow chart of the operation of the casualty monitoring system 100. In the chart, power is supplied to the casualty monitoring system 100 such that the hardware of the system operates immediately and the firmware initiates.

The following functions are done in parallel by the hardware of the casualty monitoring system 100: the depth sensors 204 are amplified and filtered; a voltage of the battery 216 is isolated and scaled; the voltage signal output from the start-up circuit 220 is amplified and filtered; leak signals are detected and filtered; the tracking transponder signal is converted from a pulse to a toggling logic level; the spare digital inputs are conditioned and filtered; the processor spare digital outputs are switched and routed to drivers and/or solid-state relays; the casualty monitoring system watchdog timer 120 operates; the depth cut-off switch signal and input is conditioned and filtered; to the output of the battery over-temperature switch 214 is conditioned and filtered; and the output of the internal over-pressure switch 208 is conditioned and filtered. The digital and analog inputs of the functions are then sent to the casualty monitoring system processor 115. Critical casualty signals (depth cutoff switch, over-temperature switch, over-pressure switch, processor watchdog data; and the casualty monitoring processor shutdown bit) are fed to the casualty logic 116.

A determination is made as to whether the casualty logic 116 detects any critical casualty signals. If there is no detection; the casualty monitoring system hardware continues to operate. If there is detection of a critical casualty signal; the start-up circuit 220 is notified to deactivate the vehicle 300 by disconnecting the battery 216 from the vehicle.

In conjunction with the hardware, the firmware of the casualty monitoring system 100 continuously reads; processes and stores the inputs of the casualty monitor processor 115. Also, the firmware pulses the watchdog timer 120. If the watchdog timer 120 expires; the start-up circuit 220 is notified to deactivate the vehicle 300 by disconnecting the battery 216 from the vehicle.

The firmware also determines whether a new vehicle controller message is received. If a new message is received from the vehicle controller 200; then the vehicle controller keep-alive timer is reset. The required commands within the message from the vehicle controller 200 are performed (typically set/reset monitoring system processor output bits). However, if the message from the vehicle controller 200 contains a shutdown command; then the start-up circuit 220 is notified to shut down the vehicle 300. A response message from the processor 115 is sent to the vehicle controller 200 with the latest monitored inputs of the casualty monitoring system 100.

In regard to the operation of the watchdog timer 120; the timer includes the actions of monitoring the processor 115 to determine if the processor is executing code as programmed. During normal function, a portion of code in the firmware of the casualty monitoring system 100 resets the watchdog timer 120. During malfunction, the code may not be processed; thereby, allowing the watchdog timer 120 to expire. This expiration sequentially triggers removal of battery power from the vehicle 300 by the start-up circuit 220. As an example, the predetermined condition of the processor 115 may include a hardware failure and/or a stack overflow in the processor with the result that the processor no longer processes the intended programmed code.

The processor 115 is hardwired to the resetting of the watchdog timer 120. Unlike existing systems, the watchdog timer 120 is tied to the casualty logic 116 instead of being tied to a reset of the casualty monitoring processor 115. The casualty logic 116 inactivates the vehicle 300 directly and immediately (via the start-up circuit 220) without requiring action by the casualty monitoring processor 115. As such, the shutdown of the vehicle 300 may not involve the firmware functions of the processor 115.

The following items trigger or are factors in the triggering of a shutdown of a vehicle in response to information provided to the casualty monitoring system 100. These factors include but are not limited to: shutdown by a failure mode of the casualty monitoring processor 115; shutdown because of stack overflow of the casualty monitoring processor (if stack overflow causes interruption); shutdown because of an improper battery voltage level; shutdown because of an improper battery current level; shutdown because of a leak of water or other conductive fluid into the vehicle 300; and a remotely activated shutdown (implemented by the operation of the tracking transponder 228).

Figure 4:
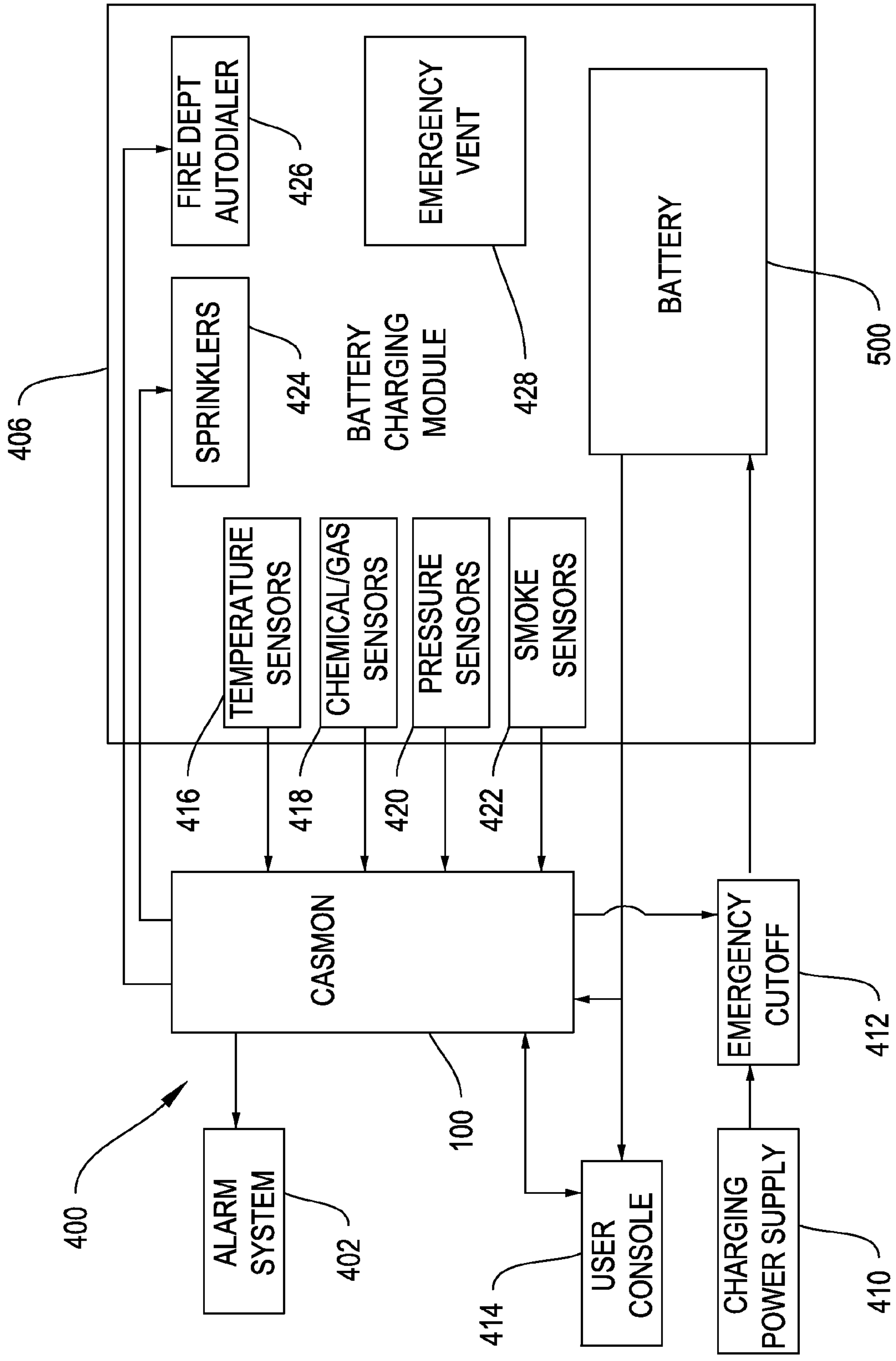
FIG. 4 depicts a block diagram of a battery charging safety system connectable to the casualty monitoring system.

FIG. 4 depicts a block diagram of a battery charging safety system 400. The safety system 400 includes an alarm system 402 connected to the casualty monitoring system 100. A battery charging module 406 contains batteries that are being charged. A charging power supply 410 for the batteries is external to the module and is cabled in through ports in the charging module 406. The battery 500 may contain an internal battery monitoring system if the battery material is Lithium Ion or contains other technology requiring an internal monitoring system.

The system 400 also includes an emergency cut-off switch 412 that interrupts current in the event of a fault with the cut-off switch triggered by the casualty monitoring system 100. The battery charging safety system 400 further includes a user console 414 that allows battery data to be displayed on a monitor so that the user can monitor charging progress and observe any developing fault conditions in the system.

The battery charging safety system 400 also includes temperature sensors 416 that sense temperature within the battery charging module 406. An overly high temperature may indicate battery malfunction. The system 400 also includes chemical/gas sensors 418 that sense compounds emitted by batteries under fault conditions. For example, in the case of lead acid batteries, dangerous and explosive hydrogen gas may be released.

The battery charging safety system 400 further includes pressure sensors 420 that sense a buildup of pressure within the battery charging module 406. The system 400 includes smoke sensors 422 that sense smoke in the module 406.

The battery charging system 400 may include a fire department auto-dialer 426 that contacts a fire department or other emergency personnel in the event of fire. The battery charging system 400 also includes an emergency vent 428 for venting to the exterior of any enclosure or building containing the battery charging module. The emergency vent 428 uses a fan to remove toxic gasses emitted during a failure of batteries. The system 400 further includes sprinklers 424 that control fires by dispensing water.

It should be understood, of course, that the foregoing relates to preferred embodiments of the invention and those modifications may be made without departing from the spirit and scope of the invention as set forth in the following claims.

What is claimed is:

1. A casualty monitoring system for use on an undersea vehicle, said casualty monitoring system comprising:

a centralized processor with firmware wherein said processor is capable of continuously processing and storing inputs for monitoring and shutdown of the vehicle;

casualty logic operationally connected to said processor;

a watchdog timer operationally connected to said processor and said casualty logic, said watchdog timer capable of monitoring said processor based on timing data sent from said processor such that interruption of the sent timing data can deactivate the vehicle with said casualty logic notifying the start-up circuit to disconnect a battery from powering the vehicle;

leak detection circuitry operationally connected to said processor and to at least two leak sensors of the vehicle wherein said leak sensors are capable of monitoring leaks of conductive fluid within the vehicle;

a signal router operationally connected to said processor with said signal router capable of routing digital outputs of said processor; and a vehicle controller keep-alive timer as software of said processor with said keep-alive timer operationally connected to and responsive to communications from a vehicle controller such that a cessation of the communications to said keep-alive timer results in said processor sending a shutdown bit to said casualty logic to signal a start-up circuit of the vehicle to shut down the vehicle by disconnecting the battery of the vehicle from powering the vehicle and wherein a renewed communication from the vehicle controller is capable of resetting said vehicle controller keep-alive timer;

wherein said casualty monitoring system is operationally connected to a depth sensor for monitoring depth of the vehicle with an output of the depth sensor being a voltage reflecting that the deeper in a water environment that the vehicle is positioned, an output voltage of the depth sensor is higher wherein said processor converts the voltage to a digital number corresponding to the value of the voltage and scaled to units of meters such that a real-time depth number is sent to the vehicle controller every tenth of a second for use in an autopilot function;

wherein said casualty monitoring system is operationally connected to a depth cut-off switch adjustable to external water pressure on the vehicle such that the depth cut-off switch notifies said casualty logic to send a shutdown signal to the start-up circuit to shutdown the vehicle by disconnecting the battery from powering the vehicle when a maximum depth is exceeded;

wherein said casualty monitoring system is operationally connected to a battery over-temperature switch such that the battery over-temperature switch notifies said casualty logic in response to a predetermined high battery temperature to send a shutdown signal to the start-up circuit and the start-up circuit shuts down the vehicle by disconnecting the battery from powering the vehicle;

wherein said casualty monitoring system is operationally connected to an over-pressure switch responsive to internal pressure of the vehicles such that the over-pressure switch in response to a predetermined high internal pressure notifies said casualty logic to send a shutdown signal to the start-up circuit and the start-up circuit shuts down the vehicle by disconnecting the battery from powering the vehicle.

2. The casualty monitoring system in accordance with claim 1 further comprising:

a plurality of switch conditioners with a first conditioner of said switch conditioners operationally connected and positioned between the depth cut-off switch and said processor;

a second conditioner of said plurality of switch conditioners operationally connected and positioned between the battery over-temperature switch and said processor; and a third conditioner of said plurality of switch conditioners operationally connected and positioned between the over-pressure switch and said processor;

wherein each of said switch conditioners is capable of filtering electrical noise present on an output of each of the switches.

3. The casualty monitoring system in accordance with claim 2 further comprising a first amplifier and low pass filter positioned between said processor and the depth sensor wherein said first amplifier and low pass filter is capable of removing high frequency noise from an output of the depth sensor.

4. The casualty monitoring system in accordance with claim 3 further comprising an isolator and scaler operationally positioned between said processor and the battery wherein said isolator and scaler is capable of isolating the battery from electronics of the vehicle, and scaling the battery voltage to levels suitable for monitoring by said processor.

5. The casualty monitoring system in accordance with claim 4 further comprising a second amplifier and filter positioned between said processor and the startup circuit wherein said second amplifier and low pass filter is capable of amplifying voltage and removing frequency noise from an output of the startup circuit.

6. The casualty monitoring system in accordance with claim 5 wherein said processor is operationally connected to and monitors a tracking transponder of the vehicle wherein the transponder is responsive to acoustic tracking signals emitted at the vehicle such that a range and bearing of the vehicle can be calculated relative to a source of the acoustic tracking signals based on the response of the transponder; and said casualty monitoring system further comprising an interface and latch that converts the acoustic tracking signals to a toggling logic level that can be monitored asynchronously such that said casualty monitoring system can use the toggling logic signal to determine how often the tracking transponder is being interrogated;

wherein said casualty monitoring system is capable of shutdown of the vehicle based on a set amount of acoustic tracking signals sent to the transponder and a predetermined response of the transponder.

7. The casualty monitoring system in accordance with claim 6 wherein said processor is operationally connected to an Ethernet network switch positioned between said processor and the vehicle controller.

8. The casualty monitoring system in accordance with claim 7, said casualty monitoring system further comprising at least one spare input operationally connected to said processor.

9. The casualty monitoring system in accordance with claim 8 wherein said casualty monitoring system is operationally connected to and capable of activating a buoyancy device for positive buoyancy of the vehicle.

* * * * *